United States Patent Office 2,742,637
Patented Apr. 17, 1956

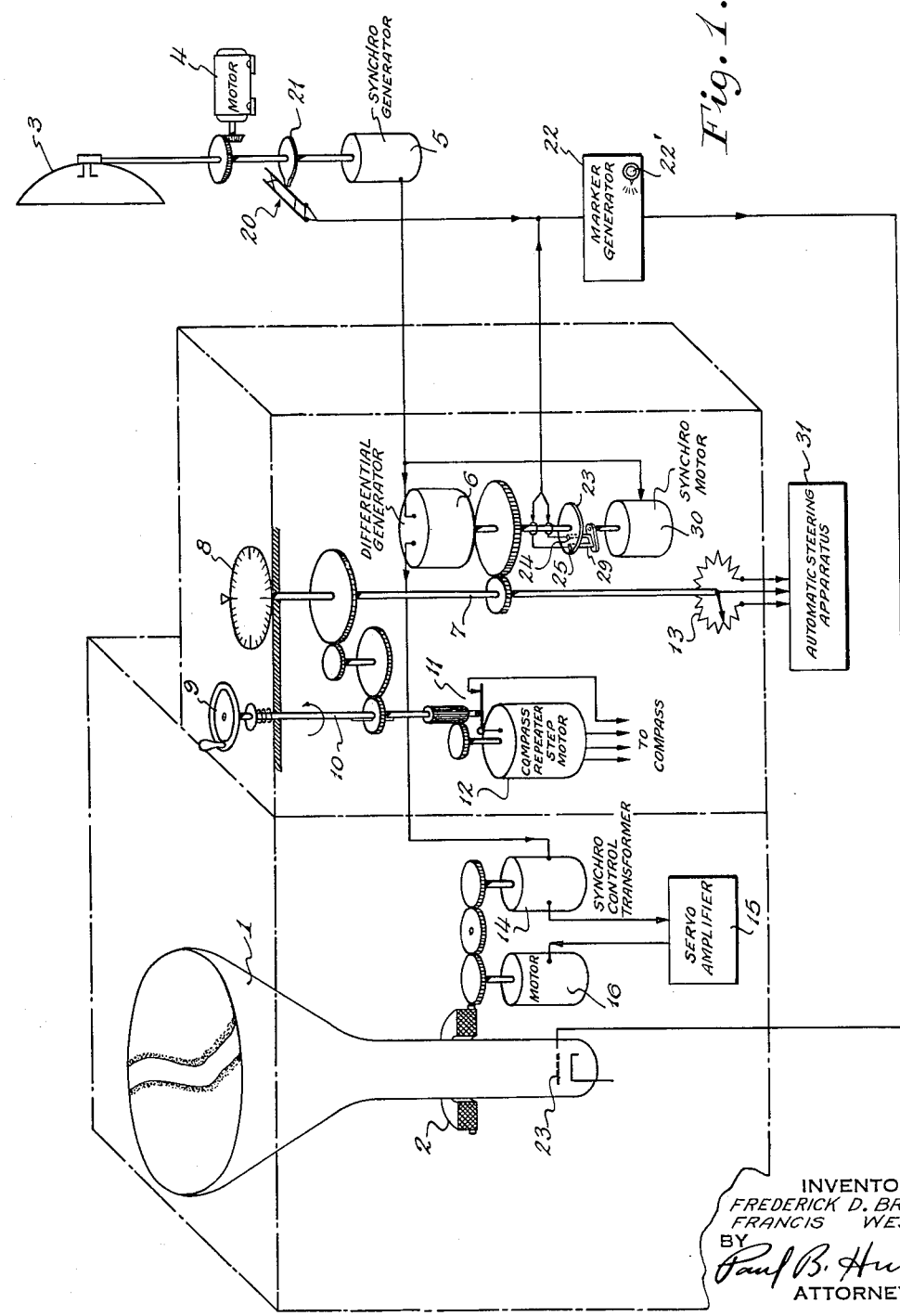

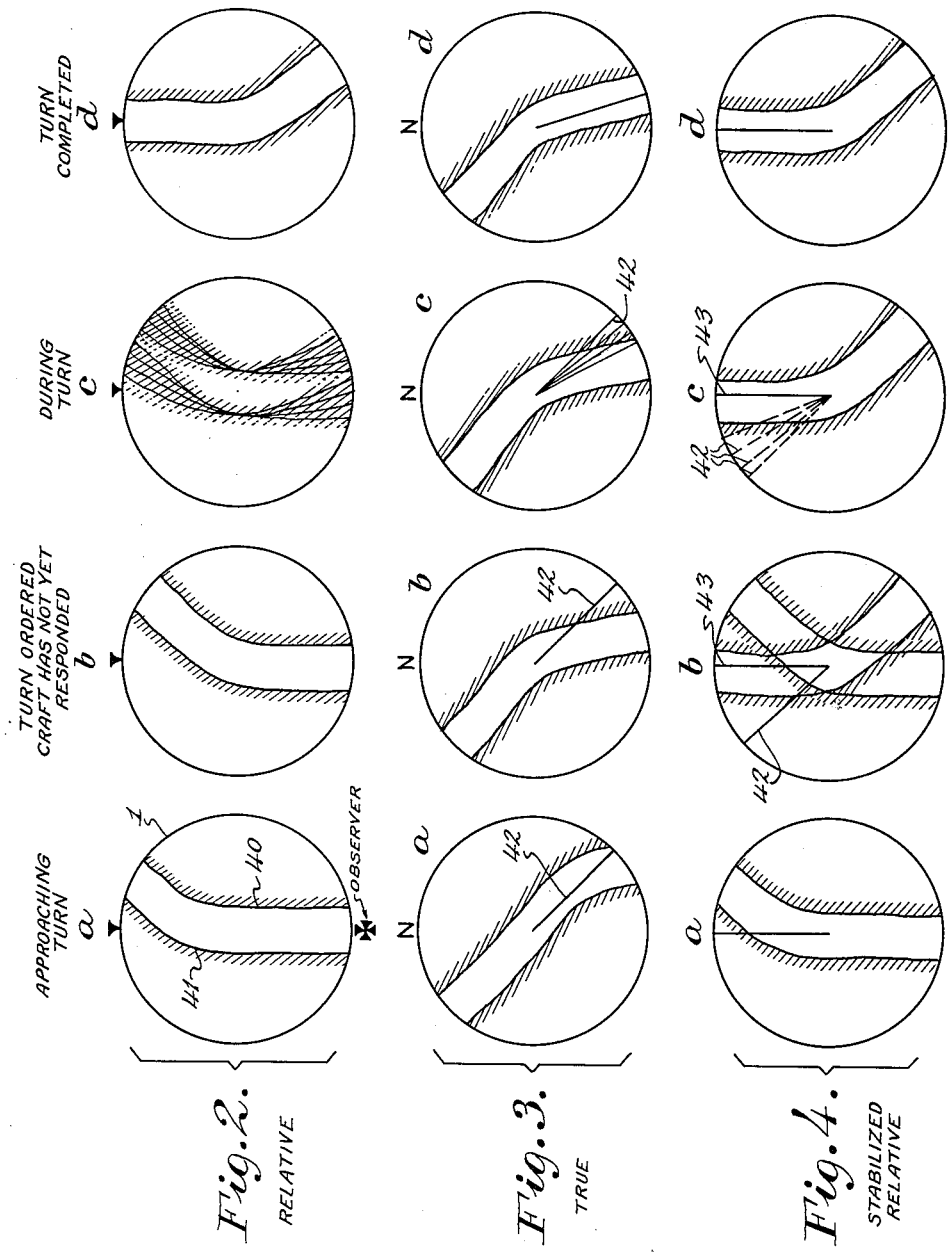

2,742,637

STABILIZED RADAR PILOT

Frederick D. Braddon, Babylon, and Francis West, Jr., Westbury, N. Y., assignors to Sperry Rand Corporation, a corporation of Delaware Application March 19, 1951, Serial No. 216,338

11 Claims. (Cl. 343—5)

This invention relates to automatic steering pilot means and more particularly to such means utilizing stabilized radar presentations.

The piloting of vessels in restricted waters such as harbors and rivers involves continual reference to navigation markers and other fixed objects. Course keeping is ordinarily maintained by visual reference to a selected fixed mark. Accurate steering, particularly of heavily laden vessels, requires detection of an incipient course error before any appreciable yaw velocity has developed.

When visibility of fixed markers is obscured and the vessel is being piloted by radar then a sensitive and stable compass reference is required to detect such slight rates of departure from course. Conventional radar presentations generally do not provide a sensitive indication of yaw due to inherent limitations in azimuth resolution, the interval of the sweep scan, and the image retention characteristics of the radar scope.

To avoid the necessity for monitoring the vessel with separate radar and compass indicators, it is advantageous to utilize automatic course-keeping with facility for introducing course changes by reference only to the radar image.

The invention described herein represents an integrated surveillance and automatic steering system by which one may conn a vessel accurately by reference only to the radar presentation. By providing a clear stabilized image with the selected heading always at the top of the scope, the present invention minimizes any possible confusion in transition from visual to radar mode of steering and vice versa.

The most useful presentation for navigation purposes is the P. P. I. or plan position indicator, which provides a representation of the surrounding locality in polar coordinates, that is, azimuth angle and range. There are two well-known types of plan position for craft navigation, namely, relative bearing presentation and true bearing presentation. In the relative presentation on a radar cathode ray tube indicator, the ship's heading always appears at the top of the cathode ray tube i. e. at the zero reference angle position on the tube circumference. Therefore, the azimuth angle of all objects shown on the presentation is read relative to the ship's keel. Since the cathode ray tube has a fixed position relative to the ship, the picture rotates on the tube face, when the ship turns, thereby causing the picture to smear. This is a disadvantage when making many turns as in river or harbor navigation.

In the true bearing presentation, the representation of the surrounding objects is stabilized so that true North is always at the top of the tube circumference, as viewed by the observer. Therefore, all true bearing azimuth angles are measured in degrees from the top of the tube circumference in a clockwise direction. The true presentation is made possible by interconnecting the vessel's gyro or other compass with the radar system to compensate for changes in the vessel's heading. The true presentation is advantageous because the picture of representation does not move on the cathode ray tube as the craft heading is changed, thereby providing a clear, definite picture and avoiding blurring. However, some pilots do not like the true presentation because the craft heading varies relative to the indicator tube requiring a mental reorientation by the pilot. The true presentation may therefore be confusing in pilotage, i. e. steering by land marks. It has been found that many experienced pilots do not like an inverted picture for the above psychological reasons. Such an inverted picture occurs on true presentation when the craft course is in a southerly direction. This is an important instrumentation problem since radar has its greatest navigation value in pilotage with respect to surrounding objects.

The present invention provides a new and improved type of radar presentation called "stabilized relative." The craft heading appears at the top of the indicator tube like standard relative, but when the course selector is changed, the picture turns immediately to the new position with the new course at the top of the tube. Thus, the picture is not continually moved relative to the tube during the entire time the craft is turning. This is accomplished by connecting the course selector knob of the automatic steering apparatus to the radar indicator in a novel manner.

Another feature of the present invention is that the relative picture is stabilized by the craft compass so that the picture will not shift or smear due to the yaw of the craft.

Therefore, the present invention avoids several of the major disadvantages of the true and relative types of presentations discussed above. The present invention provides a stabilized picture with the craft heading appearing at the top of the tube. These two conditions are incompatible in either of the conventional true and relative presentations.

Accordingly, a principal object of the invention is to provide new and improved automatic steering control means.

Another object of the invention is to provide a stabilized relative bearing radar presentation.

Another object of the present invention is to provide a radar picture with the craft heading stabilized at the top of the indicator tube.

Another object of the present invention is to provide a radar picture stabilized against yaw of the craft.

Another object of the present invention is to provide a radar picture having craft heading at the top of the indicator tube in combination with means to prevent the picture from smearing during the craft turn.

These and other advantages of the invention will be apparent from the following specification and illustrations of which:

Fig. 1 is a schematic diagram of an embodiment of the invention.

Figs. 2, 3 and 4 are radar representation illustrative of the invention.

The relative representation in Fig. 2 and the true bearing type in Fig. 3 are conventional. The stabilized relative presentation of Fig. 4 illustrates that of the present invention.

Fig. 2 illustrates the conventional relative type presentation on the cathode ray tube 1. The illustration shows the craft proceeding along a river between the river banks 40 and 41. The position of the observer is at the bottom of the cathode ray tube as shown by the Maltese cross, and the course of the vessel is towards the top of the tube. It will be seen that the vessel is heading toward the river bank 41 so that a change of course to the right is desired.

Fig. 2b illustrates the situation at the time the turn is ordered but the vessel has not yet responded.

Fig. 2c shows the situation during the turn illustrating how the picture moves gradually relative to the tube during the entire time that the ship is turning. This causes a continual smearing or blurring of the picture for the entire period of the craft turning which may be of the order of minutes for a large ship. Fig. 2d shows the condition of the radar picture after the turn is completed.

Fig. 3 shows a conventional true bearing presentation. This presentation is compass stabilized so that true north always appears at the top of the tube 1. Therefore, the course of the vessel is approximately 155° true bearing as shown by the heading marker 42. Fig. 3b shows the picture at the time that the turn is ordered. Fig. 3c illustrates the presentation during the turn. Note that the picture does not move relatitve to the tube 1 but that the heading marker 42 gradually comes around to the new course. Fig. 3d shows the presentation after the turn is completed.

Fig. 4 shows the stabilized relative presentation of the present invention. This presentation is generally similar to the relative presentation of Fig. 2 except that when the new course is ordered the picture shifts immediately with the course order. The picture does not shift continually during the turn as in the relative presentation.

Fig. 4a shows the presentation before the turn. Fig. 4b shows the presentation at the time the turn is ordered. As soon as the new turn is ordered, the picture shifts immediately so that the new course appears at the top of the tube. There is an additional angle marker provided called the course order marker. Note that the course order marker 43 does not move from the top of the tube and that the conventional heading flasher 42 is displaced immediately with the picture. When the craft is on the ordered course, the course order marker 43 and the heading marker 42 are superimposed. In other words, the picture changes instantaneously from the old course position to the new course position so that there is no prolonged smearing of the picture. Fig. 4c shows the presentation during the turn as the heading marker 42 gradually comes around to the new course. Note that there is no smearing of the picture during the time of the turn. This is particularly advantageous for river and harbor navigation where many turns are necessary. Fig. 4d shows the situation after the turn is completed. The two markers enable the angle between them to be read accurately and provide an indication of the rate of turn.

Figure 1 illustrates an embodiment of the invention utilizing the stabilized relative presentation. The radio components of the system are conventional and only the components concerned with azimuth angle information are shown, since they are all that is required for a complete explanation of the present invention.

The radar indicator comprises a cathode ray tube 1 having rotatable deflection coil 2. The deflection coil 2 is connected through an arrangement of synchros to the radar antenna 3 and to a directional reference element 12. The radar antenna 3 is adapted to be rotated by its motor 4 and the instantaneous bearing of the antenna 3 relative to the ship's keel is transmitted by synchro generator 5 to differential generator 6. The shaft of differential generator 6 is geared to shaft 7, which is connected to the course selector index 8. The course selector index 8 is also geared to shaft 10 and knob 9, which is adapted to manually rotate the course selector index.

Shaft 10 is also geared to step motor compass repeater 12 which serves as a stable azimuth reference element. The stable element 12 may be a directional gyro or it may be a compass repeater as shown. The primary requirement of the stable element is that it maintains a stable azimuth reference. If the stable element 12 is a compass repeater of the step motor type, as shown, it may be slipped, i. e. turned when the motor is denergized. However, if the stable element 12 is of another type such as a synchro repeater of the gyro compass, it will be necessary to have some disengaging means, such as a clutch connected to shaft 10, because selector index shaft 7 must move relative to the stable element 12 when selecting a new course. Knob 9 and shaft 10 are adapted to move axially, to thereby actuate switch 11 to deenergize the compass repeater step motor 12. Knob 9 and shaft 10 are preferably spring loaded so that switch 11 is normally closed except when a new course is being cranked in by knob 9.

The deflection coil 2 of the cathode ray tube 1 is adapted to be rotated in a conventional manner by a servo mechanism comprising control transformer synchro 14 which provides an error signal to servo amplifier 15 to thereby actuate motor 16. The signal applied to control transformer 14 is derived from the antenna synchro generator 5 through differential generator 6. The micro switch 20 mounted adjacent the antenna shaft is actuated by cam 21 to provide a craft heading signal to marker generator 22 when the direction of the antenna is in line with the ship's keel and pointing over the bow. This signal orients the marker signal which is generated by marker generator 22 and applied to grid 23 of cathode ray tube 1. This operation is completely conventional. Knob 22' of generator 22 is a marker intensity control.

The operation of the embodiment of Fig. 1 is as follows: Assume that the course selector index 8 is at zero. Therefore, when the antenna motor 4 rotates the synchro generator 5 connected thereto supplies a signal proportional to the angular direction of the antenna. This signal is applied through differential generator 6 which has no effect since it is now at zero position, to the control transformer 14. The angular displacement between the position of the antenna 3 and the position of the deflecting coil 2 will therefore generate an error signal in control transformer 14 which will actuate servo amplifier 15 and motor 16 to rotate deflection coil 2 to correct the error. The operation so far described is completely conventional except for the connection through differential generator 6.

Now, if the course is changed by rotating knob 9 a signal proportional to the course change will be generated in differential generator 6 and applied to control transformer 14 so that the picture will immediately turn relative to the cathode ray tube so that the new course will appear at the top of the tube. The course selector index 8 is also connected by shaft 7 to the steering potentiometer 13. Therefore, when the new course is selected, a signal will be generated on potentiometer 13 which will be applied to conventional automatic steering apparatus 31 to thereby turn the craft around to the new course. In selecting the new course knob 9 and shaft 10 are moved axially downward so as to open the switch 11 which deenergizes the compass repeater step motor 12. This allows the shaft 10 to be rotated freely, relative to compass repeater 12.

The course selector marker switch comprises mutually rotatable disc 23 and arm 29. The disc 23 is geared to the shaft of differential generator 6 and also to shaft 7. The disc 23 contains two contacts 24 and 25 which are connected to sliprings. The rotatable arm 29 is geared to a synchro motor 30 which is energized from the antenna synchro generator 5. This arm 29 contains a wire brush which is adapted to connect the two contacts 24 and 25 of the disc 23 when it is rotated past them. This switch is known as the course order marker switch and it provides the course order flash on the cathode ray tube 1 when this contact is made. The course order flash therefore will differ from the heading marker by the amount of the course change. Normally there will be no difference between them when the craft is on a desired course. It is only immediately after a course changes that there is an angular difference between the markers, as shown in Figs. 4b and 4c. The marker generator 22 may be a condenser discharge or other pulse generator as conventionally used in radar systems. Its output intensity may be varied by knob 22'.

Therefore, when a course change is made, the heading marker due to switch 20 will be rotated away from the top of the cathode ray tube display and gradually return to the top of the pictorial presentation on the tube as the craft attains the correct course. The course order marker will always remain at the top of the tube.

When the craft yaws the picture will not move relative to the tube 1 because it will be stabilized by the compass repeater 12. In standard relative operation the picture would move relative to the tube causing the picture to smear, but in the present stabilized relative mode of operation any movement tendency of the picture with respect to the tube due to a signal from the antenna synchro generator 5 is compensated by an opposite movement from the stable element compass repeater 12 so that there is no difference in the net signal from differential generator 6 applied to the deflection coil servomechanism.

To sum up, there are two traditional types of plan position radar indicators having the following advantages and disadvantages:

*Relative.*—Advantage: Provides picture with craft course at top of tube, i. e., in alignment with the eyeview over the craft bow. Disadvantage: Picture smears as craft yaws or changes course.

*True.*—Advantage: Picture does not move relative to cathode ray tube, therefore, no smearing.— Disadvantage: Picture does not have craft course at top of tube, i. e., does not remain in alignment with the eyeview over the craft bow.

Thus far, in the art, it has been a question of having one or the other of these advantages. The applicant's device substantially provides both advantages simultaneously and continuously although the prior art indicates that these advantages are mutually exclusive. The stabilized relative presentation is particularly advantageous in the automatic steering arrangement of the present invention. The stabilized relative indicator of the present invention may be used in conjunction with conventional trueor relative bearing presentations by means of suitable switching arrangements.

The invention is not limited to the particular elements shown as various equivalents may be used without departing from the scope of the invention. For instance, other types of servomechanisms, or stable elements may be used. The invention has been discussed primarily in connection with marine navigation but is equally applicable to aircraft navigation.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. In combination, craft automatic steering apparatus, navigational radar apparatus of the type having a plan position indicator with rotatable deflection coils, means to stabilize said plan position indicator and said automatic steering apparatus in azimuth comprising a stable directional reference element connected to said deflection coils and said automatic steering apparatus and course selector means connected to said automatic steering apparatus including means to disconnect said stable element from said deflection coils while selecting a new course.

2. In combination, craft automatic steering apparatus, navigational radar apparatus of the type having a plan position indicator with rotatable deflection coils, means to provide a stabilized relative bearing plan position indication on said indicator comprising a stable directional reference element connected to said deflection coils, and course selector means connected to said automatic steering apparatus, including means to disconnect said stable element from said deflection coil while selecting a new course to thereby prevent smearing of said indication during course change.

3. In combination, craft steering apparatus, navigational radar apparatus of the type having a plan position indicator with rotatable deflection coils, a stable directional element connected to control said steering apparatus and said deflection coils, a course selector for said steering apparatus means responsive to said course selector and connected and arranged to reorient said deflection coils and means to disable said stable directional element during said reorientation.

4. In a system of the character described, craft automatic steering apparatus, navigational radar apparatus having a relative bearing type indicator comprising a cathode ray plan position indicator including rotatable cathode beam deflecting means, directional gyroscope means connected to said rotatable beam deflecting means for stabilizing said indication against smearing due to craft yaw and connected to said automatic steering apparatus to stabilize said craft course, course selector means for said automatic steering apparatus including means connected and arranged to reorient said radar indication, said course selector means including means to prevent said directional gyroscope means from rotating said beam deflecting means during operation of said course selector means.

5. A directional antenna, a stabilized relative bearing indicator for a craft comprising a cathode ray plan position indicator connected to said antenna and adapted to provide a representation of objects surrounding said craft in polar coordinates relative to the craft axis including rotatable cathode ray beam deflecting means, stable directional reference means connected to said rotatable beam deflecting means for stabilizing said picture against smearing due to craft yaw, a course selector to shift said deflection coils relative to said stable element when intentionally changing course, and means responsive to the operation of said course selector to momentarily disable said directional reference means.

6. A stabilized relative bearing radar indicator for a craft comprising a cathode ray plan position indicator connected and adapted to provide a representation of reflections of objects surrounding said craft in polar coordinates relative to the craft axis, including rotatable cathode ray beam deflecting means, directional reference means connected to said rotatable beam deflecting means for stabilizing said representation against smearing due to craft yaw, selector index means connected to said cathode ray beam deflecting means to indicate thereon a selected new course, means responsive to said selector index means to momentarily disable said directional reference means and quickly rotate said representation to a position having said selected new course at zero reference angle position, and heading marker means connected to said cathode ray indicating means to indicate actual ship's heading.

7. A stabilized relative bearing radar indicator for a craft comprising a cathode ray plan position indicator connected and adapted to provide a representation of reflections of objects surrounding said craft in polar coordinates relative to the craft axis, including rotatable cathode ray beam deflecting means, directional reference means connected to said rotatable beam deflecting means for stabilizing said representation against smearing due to craft yaw, course selector index means connected to said cathode ray beam deflecting means, means connected to said selector index means to momentarily disable said directional element from rotating said deflecting means and shift said deflecting means relative to said directional reference to thereby quickly rotate said representation to a position having said selected new course at zero reference angle position, and marker means connected to said cathode ray deflecting means to indicate actual ship's heading.

8. A stabilized relative bearing radar automatic pilot for a craft comprising a cathode ray plan position indicator connected and adapted to provide a representation of reflections of objects surrounding said craft in polar coordinates relative to the craft axis including rotatable cathode ray beam deflecting means, directional reference means connected to said rotatable beam deflecting means for stabilizing said representation against smearing due to craft yaw, course selector knob means connected to said cathode ray beam deflecting means, means including switching means responsive to said selector knob means to move said deflecting coil with respect to said directional reference means to thereby quickly rotate said representation to a position having the selected new course at the top of said indicator tube, marker means connected to said cathode ray deflecting means to indicate actual ship's heading, and automatic steering means connected to said course selector knob to turn said craft to said selected heading.

9. In a craft having a compass, automatic steering apparatus, and a navigational radar of the type having a plan position indictor with rotatable deflection coils, means to provide a stabilized relative bearing plan position indication comprising a stable element compass repeater connected to said compass and to said deflection coils, and course selector means connected to said deflection coils and to said automatic steering apparatus, said course selector means being arranged to momentarily deenergize said compass repeater and shift said deflection coil relative to said compass repeater when selecting a new course.

10. In a craft having a compass, automatic steering apparatus and a navigational radar of the type having a plan position indicator with rotatable deflection coil, means to provide a stabilized relative bearing plan position indication comprising a stable element compass repeater connected to said compass and to said deflection coil, course selector means connected to said automatic steering apparatus including means arranged to disable said stable element compass repeater and rotate said deflection coil relative to said compass repeater, and a course selector marker switch comprising a first rotatable contact adapted to be rotated by said radar antenna and a second rotatable contact adapted to be rotated by said course selector means.

11. In a craft having automatic steering apparatus and a navigational radar of the type having a plan position indicator with rotatable deflection coil; means to provide a stabilized relative bearing plan position indication on said indicator comprising a directional reference connected to said deflection coils, and course selector means connected to said automatic steering apparatus including means arranged to disable said directional references and reorient said stable element with respect to said deflection coil.

References Cited in the file of this patent

UNITED STATES PATENTS

| | | |
|---|---|---|
| 1,814,842 | Murphy | July 14, 1931 |
| 2,272,607 | Higonnet | Feb. 10, 1942 |
| 2,419,970 | Roe et al. | May 6, 1947 |
| 2,448,007 | Ayres | Aug. 31, 1948 |
| 2,482,809 | Thompson | Sept. 27, 1949 |
| 2,489,251 | Anast | Nov. 29, 1949 |
| 2,573,021 | Higinbotham | Oct. 30, 1951 |
| 2,625,678 | Allison | Jan. 13, 1953 |